United States Patent

Mayer et al.

[15] 3,642,609
[45] Feb. 15, 1972

[54] DEWAXING WAXY OIL BY DILUTION CHILLING

[72] Inventors: Ivan Mayer, Summit; Stephen F. Perry, Westfield, both of N.J.

[73] Assignee: Esso Research and Engineering Company

[22] Filed: Nov. 13, 1969

[21] Appl. No.: 876,366

[52] U.S. Cl. ............................................. 208/33, 208/37
[51] Int. Cl. ............................................. C10g 43/08
[58] Field of Search ............. 208/31, 33, 37, 38; 196/14.5, 196/135

[56] References Cited

UNITED STATES PATENTS

| | | | |
|---|---|---|---|
| 2,287,966 | 6/1942 | Brandt | 208/37 |
| 2,361,503 | 10/1944 | Schutte et al. | 196/14.5 |
| 2,410,483 | 11/1946 | Dons et al. | 208/33 |
| 3,038,854 | 6/1962 | Kiersted | 208/37 |

*Primary Examiner*—Herbert Levine
*Attorney*—Pearlman and Stahl and C. D. Stores

[57] ABSTRACT

Waxy oil is dewaxed by shock chilling with prechilled solvent under conditions of agitation sufficient to obtain substantially instantaneous mixing at a plurality of points along the length of a vertical tower wherein the velocity of solvent injection is at least 5 to 10 times that of the peripheral velocity of the mixer blades.

14 Claims, 3 Drawing Figures

EFFECT OF SOLVENT JET
TURBULENCE ON FILTER RATE

EFFECT OF SOLVENT JET TURBULENCE ON DEWAXED OIL YIELD

3,642,609

DEWAXING WAXY OIL BY DILUTION CHILLING

BACKGROUND OF THE INVENTION

It is known in the prior art to dewax petroleum oil stocks by cooling an oil/solvent solution in scraped surface exchangers. In this type process, the oil and selective solvent are admixed at a temperature sufficient to effect complete solution of the oil and its contained wax in the solvent. The extent of dilution is dependent upon the particular oil and the particular solvent employed and is adjusted to facilitate easy handling and optimum filtration rates. The solution is cooled at a uniformly slow cooling rate; e.g. 1°–5° F./minute, under conditions which are controlled so as to avoid any substantial agitation of the solution during precipitation of the wax. Notwithstanding the carefully controlled conditions used in this type process, there are several deficiencies which hamper successful commercial operation. Most significant among these deficiencies is the loss of good heat transfer due to wax deposition on the exchange surfaces. Such fouling has been repeatedly noted after short periods of operation; e.g. 24–48 hours. Associated directly with the loss of good heat transfer is the loss of careful control over the cooling rate and a corresponding loss of uniform crystal growth. This nonuniform crystal growth then results in lower filtration rates. The high-pressure drop through the chilling section also reduces the maximum feed rate attainable. Physical mashing of the wax crystals by the action of the scrapers may also contribute to poor filtration.

It is also known in the prior art to dewax petroleum oil stocks by cooling in scraped surface exchangers using an incremental solvent addition technique.

In this technique the solvent is added at several points along the chilling apparatus. The waxy oil is chilled without solvent until some wax crystallization has occurred and the mixture has thickened considerably. The first increment of solvent is introduced at this point and cooling continues. Each increment of solvent is added as necessary to maintain fluidity, until the desired separation temperature is reached, at which point the remainder of the solvent desired for filtration is added. In this technique, which is in common industrial use, it is well known and has been repeatedly demonstrated that the temperature of each increment of solvent should be the same as that of the main stream at its point of addition. Having the solvent at a lower temperature causes shock chilling of the slurry at that point, with resulting formation of crystal fines and impairment of filter rate; having the solvent warmer throws an unnecessary additional load on the scraped surface chillers. It should be clearly understood that all the chilling of the slurry in this well known process is accomplished through the walls of the scraped surface chillers, rather than by means of cold solvents. This process requires somewhat less of the costly scraped surface heat exchange than the first one cited, because less of the solvent chilling is done in scraped surface. Dewaxed oil yield is also higher on some stocks, but otherwise, it suffers from the same disadvantages previously cited.

In copending application Ser. No. 666,268 filed Sept. 8, 1967 now abandoned for Donald B. Hislop, there is proposed a method of dewaxing oils in which the oil is shock chilled by contacting it with a cold solvent at a plurality of points along a vertical tower while maintaining a zone of intense agitation at each point of solvent injection such that substantially instantaneous mixing occurs at each point, i.e., within a second or less.

In this process all the chilling of the slurry is accomplished by the cold solvent, and no scraped surface, indirect chilling is involved. The intense agitation more than overcomes the well known harmful effects of shock chilling and results in the formation of a wax slurry having a unique crystal structure with markedly superior filtering characteristics—a relatively high filter rate and good dewaxed oil yield. It is disclosed in Ser. No. 666,268 that the intense agitation is provided by mechanical mixers, driven by a variable speed mechanism.

SUMMARY

While the process of Ser. No. 666,268 overcomes the disadvantages of the prior art, it has been found that even better results are obtained when the cold solvent is introduced to each mixing zone of the tower through a plurality of small, suitably placed injection nozzles, with the injection velocity of the solvent at least five–ten times the peripheral velocity of the mixer blades and within the turbulent flow range. However the injection velocity of the solvent may be as high as 30 times the peripheral velocity of the mixer blades.

Thus according to this invention the petroleum oil stock is introduced at one end of a vertical, multistage mixing column and shock chilled by contacting it with cold solvent injected into each stage under agitation condition, to effect substantially instantaneous mixing. The chilled slurry containing crystallized wax is drawn off the other end and may be further cooled by conventional means, prior to separation of the wax by filtration or other means, and recovery of solvent from both the wax and oil-containing fractions. It is a particular feature of the present invention that the velocity of solvent injection into each stage is five–ten or even 30 times that of the peripheral velocity of the mixer blades in each stage.

DETAILED DESCRIPTION

Figure 1:
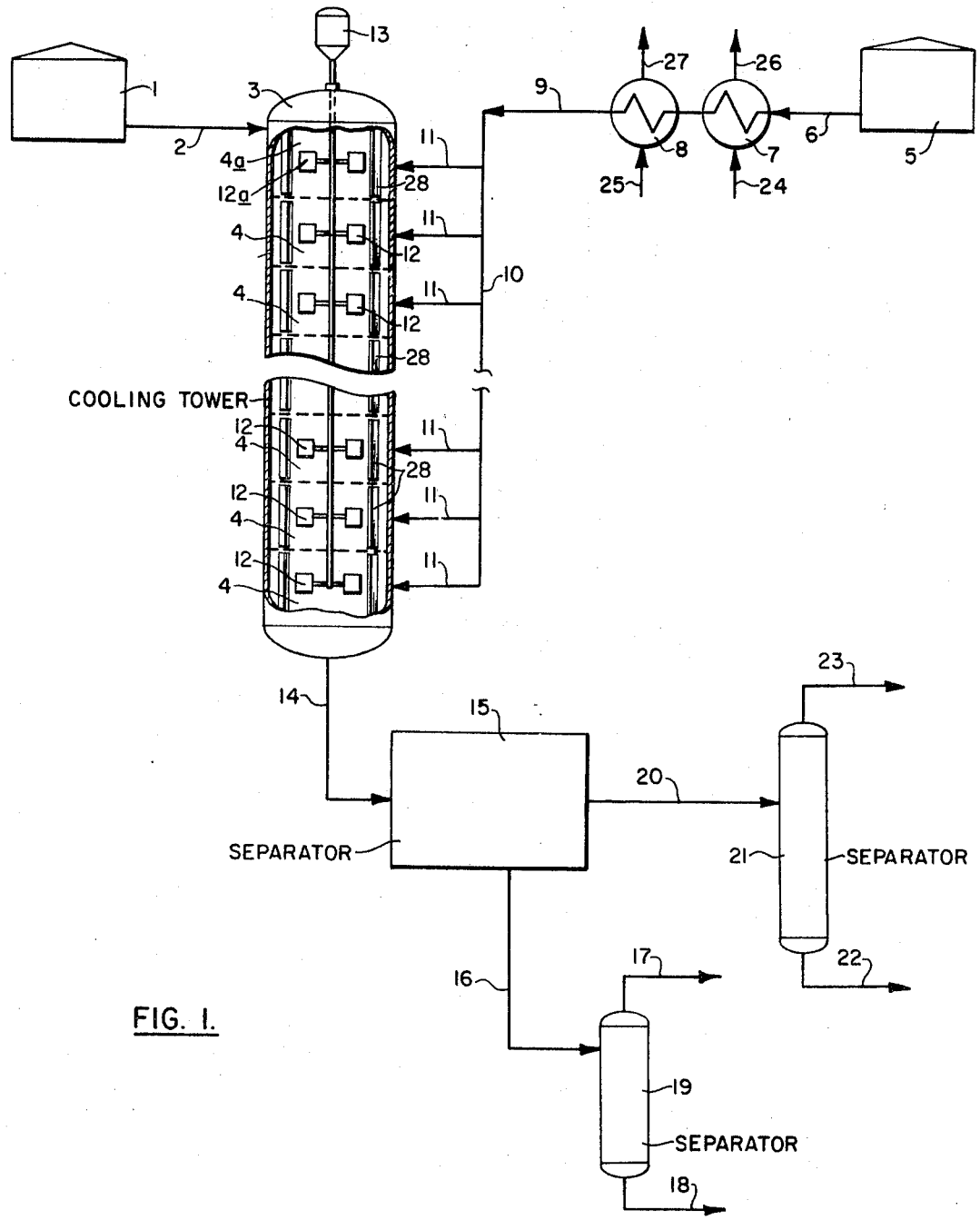
FIG. 1 is a flow diagram of the preferred embodiment of the invention.

Referring to FIG. 1, the oil stock to be dewaxed is conducted from the storage tank 1, through line 2, to the top of the vertical cooling tower 3, where it enters the first stage of the cooler 4a. The selected solvent is passed from storage tank 5 through line 6, through heat exchangers 7 and 8, where the solvent temperature is reduced to that sufficient to cool the oil to the desired temperature. Coolant enters the heat exchangers 7 and 8 through lines 24 and 25, respectively and leaves through lines 26 and 27. The solvent leaves the heat exchanger 8, through line 9, and enters manifold 10. The manifold comprises a series of parallel lines providing solvent inlets 11 to the several stages of the cooling tower 3. The rate of flow through each inlet is regulated by flow control means (not shown). The rate of solvent flow is regulated so as to maintain a desired temperature gradient along the height of the cooling tower 3. The first portion or increment of the solvent enters the first stage, 4a, of the cooling tower 3 where it is substantially instantaneously admixed with oil due to the action of the agitator 12a. The agitator is driven by a variable speed motor 13 and the degree of agitation is controlled by variation of the motor speed, with due allowance for the flow rate through the cooling tower. The oil-solvent mixture may pass upwardly or downwardly through the cooling tower 3 (downward flow only has been shown). At various heights along the cooling tower, additional prechilled solvent is introduced to each of the several stages 4, through inlets 11 so as to maintain substantially the same temperature drop from each mixing stage to the next and at the same time to provide the desired degree of dilution. It should be noted that any number of stages up to 50 may be employed; however, at least six should be used. The oil-solvent solution with precipitated wax passes from the final stage of the cooling tower through line 14 to means for separating the wax from said solution 15. If desired the oil-wax mixture may be further cooled by any conventional means not shown. Any suitable means such as filtration or centrifugation for such separation may be employed. The wax-solvent is removed from the separation means through line 16. The solvent is recovered from the wax in a suitable separating system 19, which is preferably done by stripping with an inert gas such as nitrogen, steam or air or by straight distillation. The solvent leaves the separator 19 through line 17 and the wax exits through line 18. The oil-solvent solution leaves the wax separation means through line 20 and passes to means for separating the oil from solution 21. Any suitable means for this separation may be used, such as distillation, selective adsorption, or stripping with an inert gas such as nitrogen, air or steam. The oil is removed from the separator and is recovered through line 22. The solvent is removed through line 23. The solvent may be recycled directly or scrubbed to remove impurities before reuse.

Any petroleum oil stock or distillate fraction thereof may be dewaxed by the process of this invention. In general, these oil stocks or distillate fractions will have a boiling range within the broad range of about 500° F. to about 1,300° F. The preferred oil stocks are the lubricating oil and specialty oil fractions boiling within the range of 550° F. and 1,200° F. These fractions may come from any source, such as the paraffinic crudes obtained from Aramco, Kuwait, the Panhandle, North Louisiana, Tia Juana, etc.

Any low-viscosity solvent for oil may be used in the process of this invention. Representative of such solvents are the ketones having three to six carbon atoms, such as methyl ethyl ketone (MEK) and methyl isobutyl ketone (MIBK) and the low molecular weight hydrocarbons such as ethane, propane and butane, as well as mixtures of the foregoing ketones and mixtures of the aforesaid ketones with aromatic compounds such as benzene and toluene. In addition, the halogenated low molecular weight hydrocarbons such as dichloromethane and dichloroethane and mixtures thereof may be used as solvents. Specific examples of suitable solvent mixtures are methyl ethyl ketone and methyl isobutyl ketone; methyl ethyl ketone and toluene and dichloromethane and dichloroethane. The preferred solvents are the ketones. A particularly preferred solvent mixture is a mixture of methyl ethyl ketone and methyl isobutyl ketone.

During the operation of the process of the present invention, the petroleum oil stock is fed to the cooling tower 3 at a temperature above its pour and cloud point. In the case of an oil fraction containing a relatively low amount of wax, the oil may be fed at ambient temperature. In the case of an oil containing a relatively large amount of wax an elevated temperature will be used. In general, the wax content of the oil feed will vary between 10 and 25 weight percent and the pour and cloud points will range between 70° and 170° F. and 75° and 175° F., respectively.

The solvent, or solvent mixture, will be prechilled to a temperature sufficient to permit cooling of the oil to the desired temperature. It will be apparent to those skilled in the art that the exact solvent temperature employed will depend upon the amount of oil to be cooled and the amount of solvent to be added to the oil; i.e. the degree of dilution which is sought during the filtration step. The prechilled solvent is added incrementally along the height of the cooling tower so as to maintain an overall average chilling rate below about 10° F./minute and preferably between 1 to about 5° F./minute. In general, the amount of solvent added will be sufficient to provide a liquid/solid weight ratio between the range of 5/1 and 20/1 at the dewaxing temperature and a solvent/oil volume ratio between 1.5/1 and 5/1.

In general the degree of agitation must be sufficient to provide substantially instantaneous mixing; i.e., substantially complete mixing of the oil-solvent mixture in one second or less. In this way, the deleterious effects of shock chilling are offset; the chilling rate is more readily controlled and increased filtration rates are obtained.

The critical feature of this invention lies in employing solvent jet velocities in the range of five to 30 times the peripheral velocity of the tip of the impeller blades. It is preferred to use a multiplicity of small diameter solvent injection nozzles (⅛-inch diameter or less) on each stage. The pressure drop through the high-velocity jet nozzles serves to distribute the flow evenly between jets of equal size, making it unnecessary to employ a multiplicity of control valves for this purpose. The flow in these jets is in the turbulent regime. It is preferred that the jet nozzles have a length to internal diameter ratio of at least 20 to 1; be either straight sided internally or slightly coned to converge in the direction of flow: have a streamlined entrance; and be streamlined externally with minimum wall thickness, particularly at the tip. These design preferences are to prevent plugging, minimize unnecessary pressure losses, minimize interference with flow patterns in the fluid surrounding the jet, and minimize opportunity for wax deposition on the external surface of the jet nozzles.

To obtain most effective mixing from the combination of the jets and the mechanical stirrers, proper location of the jets is important. For this reason the jets are placed just outside the periphery of the impellers, with the jets directed vertically at right angles to the peripheral flow from the impellers, jetting into the region of maximum impeller-induced velocity. This region is at the centerline of the impellers. Optimum placement of the jet nozzles vertically, is such that the jet stream velocity will have decayed to approximately the impeller tip or peripheral velocity when the stream reaches the impeller center line. As an approximation known to those skilled in the art, a turbulent jet stream entering a body of similar fluid will double its volume by drawing in surrounding fluid, and halve its velocity, in a length corresponding to five nozzle diameters. Thus, for example, if nozzle velocity is eight times peripheral velocity, the nozzle tip should be approximately 15 nozzle diameters below the impeller center line if pointing upward. For 1/16-inch diameter nozzles this distance would be 15/16; at 80 feet/second nozzle velocity (to continue the example) the time required to travel this distance, during which the jet stream is mixed with about seven times its volume of surrounding fluid, is approximately 0.005 seconds. At this point it can be considered that the flow induced by the impellers "takes over" and completes the mixing.

The degree of agitation required in this invention to provide a high degree of turbulence in the bulk of the fluid can be achieved by increasing the agitator r.p.m. when other mixing variables; e.g., flow rate through the mixer, vessel and agitator design, viscosity of the ingredients, etc., are maintained constant. In general, the degree of agitation required in this invention can be achieved when the modified Reynolds Number, (Perry, "Chemical Engineer's Handbook," 3rd, pp. 1224, Mc-Graw-Hill, New York, 1959), $N_Re$, which is defined by the equation:

$$N_Re = L^2 n l / \mu$$

where $L$ = agitator diameter, ft.
$l$ = liquid density, pound/feet$^3$
$n$ = agitator speed, r.p.s.
$\mu$ = liquid viscosity, pound/feet second is between about 200 and about 100,000 and the dimensionless ratio of cooling tower diameter to agitator diameter is between about 1.5/1 and about 10/1. A flat bladed turbine type agitator is preferred; however, other types of agitators such as propellers may be used.

The mixing zones in the cooling tower may or may not be baffled, but a baffled tower is preferred. For example, three baffles 28 are shown in each stage of tower 11, being placed 120° apart. The tower is divided into several cooling stages by horizontal circular plates and/or shallow dished heads which restrict flow between the stages and thereby substantially prevent back mixing. In general, the dimensionless ratio of the cross section of the restricted flow opening to the cross section of the tower will be between about 1/20 and about 1/200.

In general, the cooling tower of the present invention will be operated at a pressure sufficient to prevent flashing of the solvent. Atmospheric pressure is sufficient when the ketones are employed as solvents; however, superatmospheric pressure is required when the low molecular weight hydrocarbons, such as propane, are employed.

PREFERRED EMBODIMENT

The invention will be more apparent from the preferred embodiment and working examples set forth below. Turning again to the drawing, a lubricating oil distillate fraction, having a boiling range from 850° to 950° F., a wax content of from about 18 to about 21 weight percent, and initial pour and cloud points between about 110° and 120° F. and 112° and 125° F., respectively, is fed from the storage tank 1 through 2 to the first stage 4a of the cooling tower 3 at a temperature of 115° to 130° F. A solvent such as methyl isobutyl ketone or a mixture of 55 weight percent methyl isobutyl ketone and 45 weight percent methyl ethyl ketone is passed from storage tank 5 through line 6 to the heat exchangers 7 and 8, where the solvent is cooled by conventional means to a temperature between −20° and −40° F. In the preferred embodiment cold filtrate from line 32 is used to precool the solvent in heat exchanger 7. The filtrate enters through line 24 and leaves through line 26. The solvent is further cooled in heat exchanger 8 with liquid propane or other suitable coolant, entering through line 25 and leaving through line 27. The chilled solvent passes from the heat exchanger 8 through line 9 to the manifold 10. In the preferred embodiment the cooling tower is divided into 16 stages, 4, and the manifold consists of 16 parallel solvent inlets 11, one for each mixing stage. Although not shown on the drawing, the solvent entering each stage inlet pipe 11 is further subdivided and injected into the stage through a multiplicity of small, suitably placed jet nozzles as hereinbefore described. The solvent flow rate to each stage is controlled so as to give the desired temperature drop per stage, preferably merely by providing the proper number and size of jet nozzles for each stage. A design pressure drop of at least 20 p.s.i. through the nozzles is preferred to ensure the desired distribution of flow. Each of the sixteen separate stages is provided with an agitator turbine 12 which is turned at a sufficiently high r.p.m. to produce adequate mixing of the stage contents. The solvent jet velocity must be within the turbulent flow range, may vary from 50–100 feet/second or more and is held within the range of five–30 times the peripheral velocity of the turbine blades. The oil and solvent entering the first stage 4a is substantially instantaneously mixed. As the oil-solvent mixture passes downwardly through the cooling tower, it is substantially instantaneously mixed with the contents of each subsequent stage and with the additional solvent which is added to each stage. As a result of the simultaneous, extremely rapid mixing of the warmer oil or oil solvent mixture from the preceding stage, and the cold solvent, with the contents of each stage the temperature of the total mixture in a given stage remains substantially constant. Thus, the temperature of the slurry drops in a series of sharp steps or shock chillings as it proceeds through the tower. Most surprisingly, this results in the formation of wax crystals of a very uniform size and very compact structure, having markedly superior filtering characteristics.

The oil-solvent mixture leaves the bottom of the cooling tower as a slurry containing the wax crystals. It is chilled further, by conventional scraped surface to about 0° F. (means not shown) and then passes through line 14 to a separating means 15 which is preferably a rotary vacuum filter. The wax-solvent is passed through line 16 to a separating means 19 which is preferably distillation. The wax is recovered through line 18 and the ketone solvent is recovered through line 17. The oil-solvent solution is passed through line 20 to a separating means which is preferably distillation. The dewaxed oil is recovered through line 22 and the mixed ketones solvent is recovered through line 23.

EXAMPLE 1

A laboratory experiment was carried out in a single stage batch unit provided with a flat bladed turbine type impeller and a solvent jet tube. This batch unit does not completely duplicate continuous multistage operation but has been found to give approximately equivalent results. The unit was filled with the waxy oil to be chilled, at just above its cloud point, and the motor-driven impeller started. A solvent consisting of a mixture of methyl ethyl ketone and methyl isobutyl ketone, prechilled to about −25° F., was introduced to chill the mixture at the desired rate. Excess slurry was allowed to overflow. When the slurry reached a specified temperature the contents were drawn off, chilled further by conventional means as required to reach a common filtration temperature, additional solvent added at filtration temperature if desired (secondary dilution) and the slurry filtered. The dilution chilling solvent rate was varied from 44 cc./minute at the start of chilling to about 500 cc./minute at the end. Both turbulent and non tur-

TABLE I.—EFFECT OF TURBULENT KETONE INJECTION ON DILUTION CHILLING PERFORMANCE

12″ single stage; 6″ turbine (flat bladed)

| Run No. | Dilution ratio | | | | | Filter rate | | Yield | | Percent oil in wax |
|---|---|---|---|---|---|---|---|---|---|---|
| | Tower | Sec. | Dil. | Wash | Total | No. wash | Wash | No. wash | Wash | |
| *412 r.p.m. 650 ft./min.* | | | | | | | | | | |
| SU. 101 | 2.6 | 1.0 | | 1.6 | 5.2 | 5.4 | 6.7 | .67 | 80.5 | |
| 102 | 2.3 | 1.8 | | 1.7 | 5.8 | 5.5 | 6.5 | 70 | 80.5 | |
| 103 | 2.8 | Nil | | 1.2 | 4.0 | 5.0 | 6.9 | 67 | 80.2 | |
| 104 | 1.8 | 1.1 | | 1.1 | 4.0 | 5.6 | 7.3 | 64 | 80.4 | |
| *250 r.p.m. 390 ft./min.* | | | | | | | | | | |
| 105 | 0.85 | 1.25 | | 0.9 | 3.0 | 3.7 | 4.6 | 64 | 79.1 | |
| 106 | 2.9 | Nil | | 1.4 | 4.3 | 3.7 | 4.6 | 73 | 82.4 | |
| *200 r.p.m. 310 ft./min.* | | | | | | | | | | |
| 107 | 2.6 | Nil | | 0.9 | 3.5 | 3.4 | 3.9 | 66 | 80.3 | |
| 108 | 3.8 | Nil | | 1.3 | 5.1 | 3.5 | 4.1 | 73 | 82 | |
| *15 sec., 30 sec.* | | | | | | | | | | |
| 109 | 3.8 | Nil | 0.8 | | 4.6 | 3.3 | 3.1 | 72 | 76 | |
| | | | | 1.2 | 5.0 | | 3.8 | | 82 | |
| 110 | 3.3 | Nil | 0.65 | | 3.95 | 3.4 | 3.6 | 72 | 78 | |
| | | | | 1.1 | 4.4 | | 4.1 | | 83 | |
| NON-TURBULENT INJECTION | | | | | | | | | | |
| *250 r.p.m. 390 ft./min.* | | | | | | | | | | |
| 111 | 5.6 | Nil | | 1.6 | 7.2 | 2.2 | 2.7 | 76 | 83 | |
| 112A | 2.1 | Nil | | 0.5 | 2.6 | 2.8 | 3.0 | 59 | 65 | |
| 112B | 2.1 | | 0.5 | 1.0 | 3.6 | 2.7 | 3.1 | 63 | 74 | |
| *412 r.p.m. 650 ft./min.* | | | | | | | | | | |
| 114 | 2.4 | 1.3 | | 1.1 | 4.8 | 3.2 | 3.9 | 70 | 81 | |
| 115 | 2.5 | | | 0.9 | 3.4 | 3.1 | 3.6 | 65 | 76 | | bulent solvent injection were used in separate experiments. For non turbulent injection, a single 1/16-inch diameter solvent inlet was used, positioned close to one of the impeller blades. Linear velocity through this inlet varied from 1.2 feet per second at the start to about 14 feet per second at the end.

For turbulent injection, four injection nozzles were used, spaced 90° apart around the periphery of the impeller, two being 0.0080 inches in diameter and two 0.012 inches in diameter. A single 0.0080 inch diameter jet was used for the initial flow of 44 cc./minute, giving a linear velocity of 75 feet per second and a Reynolds number of 4000, barely turbulent. When the flow had doubled to 150 feet per second and the Reynolds number had increased to 8000, the second 0.0080 inch jet was cut in, flow was divided between the two and both were used until the flow had doubled again. The third and fourth jets were cut in as required, maintaining turbulent jet flow and jet velocities between 75 and 150 feet per second throughout the chilling. The ratio of jet velocity to impeller tip speed varied within the range of 7-30 for these runs. The results are shown in Table I and in FIGS. 2 and 3. It will be appreciated that it was necessary to use extremely small diameter jets in these laboratory experiments in order to maintain jet velocities within the desired, turbulent flow regime at the low total solvent flow rates required. Use of multiple jets of up to about ⅛ inch diameter is contemplated for commercial designs.

Figure 2:
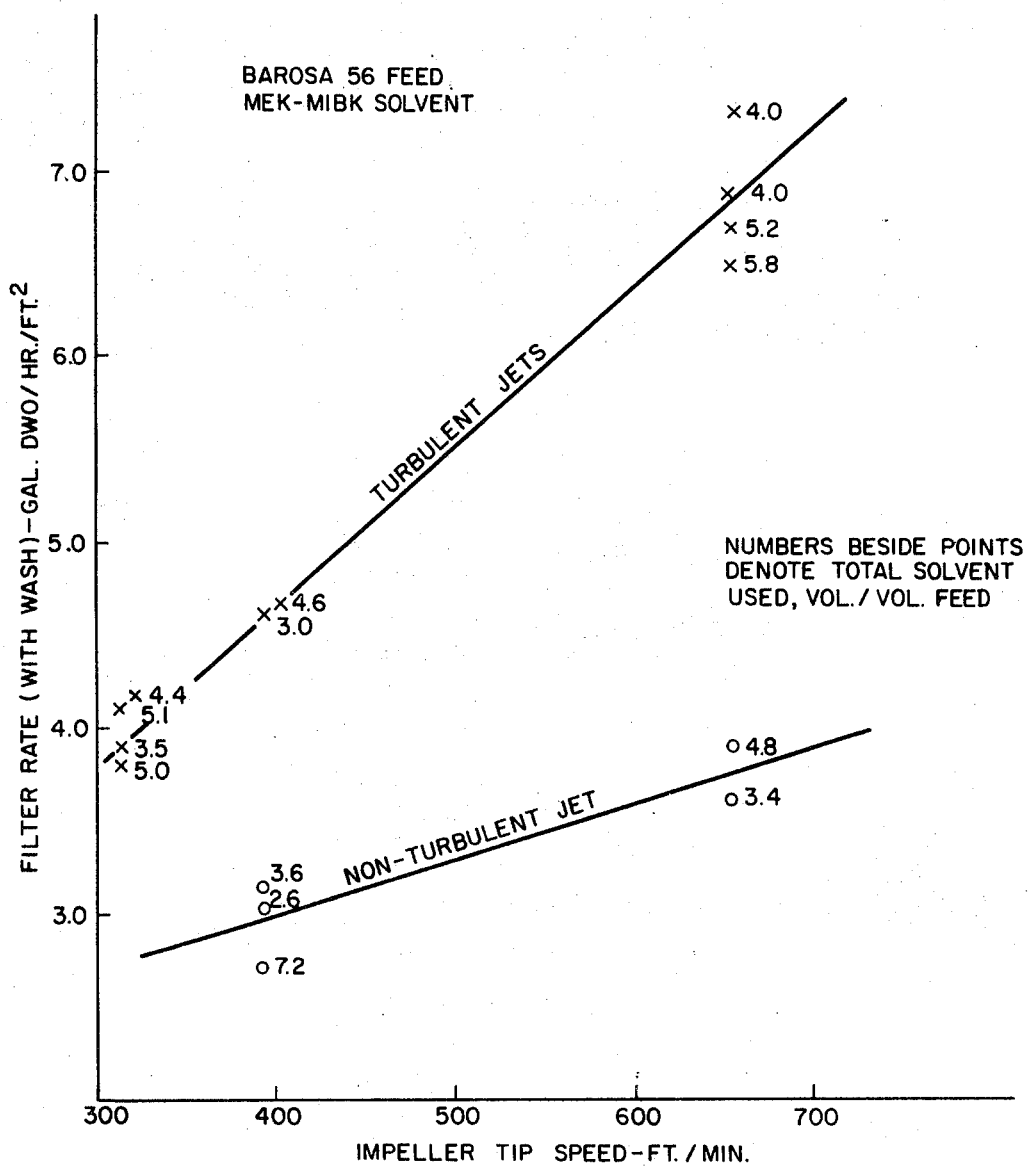
FIG. 2 shows the effect of solvent jet turbulence on filter rate.
Figure 3:
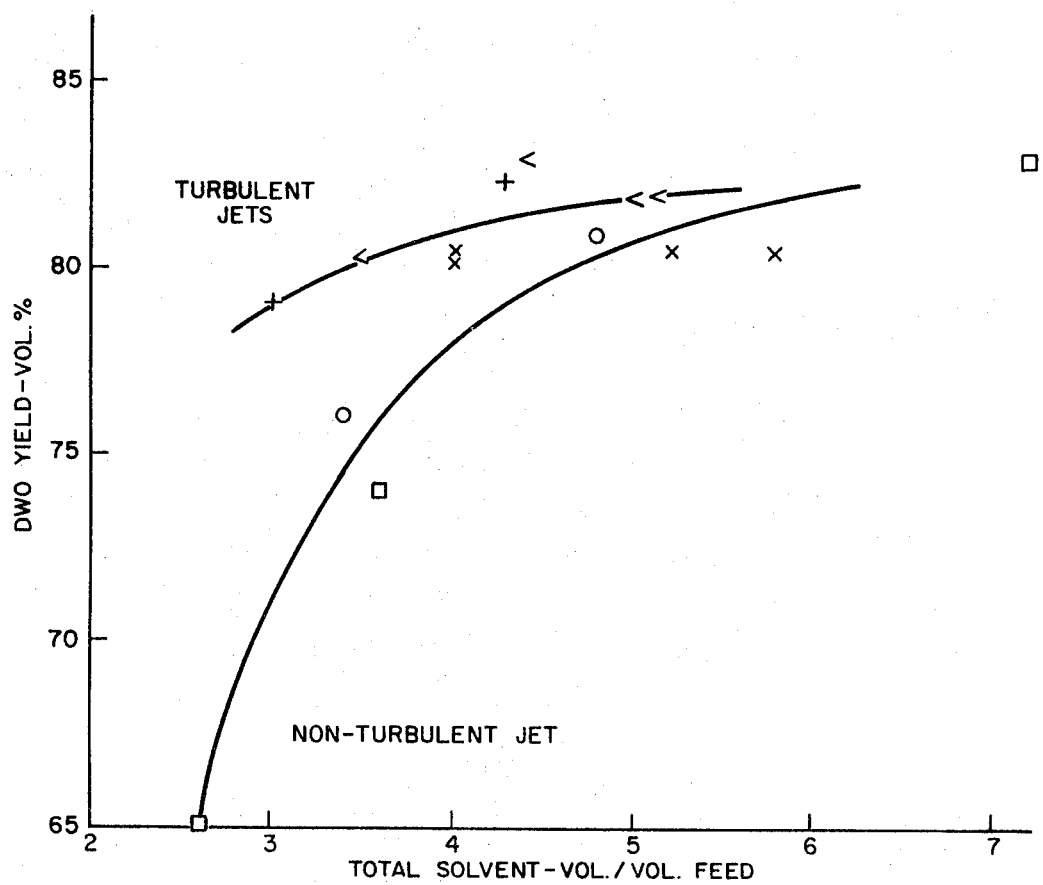
FIG. 3 shows the effect of solvent jet turbulence on dewaxed oil yield.

These data show the marked improvement in filter rate obtained with the turbulent, multipoint jet solvent injection system (FIG. 2) and indicate an improvement in dewaxed oil yield for a given use of solvent (FIG. 3).

It will be noted in FIG. 2 that the same filter rates result from the use of turbulent jets with 300 feet/minute impeller tip speed as with nonturbulent jets and 700 feet/minute tip speed. Since power consumption for mechanical mixing is proportional to the cube of tip speed, this represents a power saving of over 90 percent, at constant filter rate. However an overall economic balance between filtering equipment, mixing equipment, solvent recovery equipment and refrigeration requirements will determine the exact impeller tip speed which will be preferred.

We claim:

1. A method for dewaxing a waxy petroleum oil stock comprising introducing said petroleum oil stock into a chilling zone divided into a plurality of stages, passing said oil stock from stage to stage of said chilling zone, injecting a cold dewaxing solvent into said chilling zone at a plurality of spaced points along said chilling zone, maintaining a high degree of agitation in at least a portion of said stages by means of a rotating impeller located in said stages thereby effecting substantially instantaneous complete mixing of said solvent and said oil, maintaining the injection velocity of said solvent between five and 30 times that of the peripheral impeller speed and cooling the solvent/waxy oil mixture as it progresses through the chilling zone thereby precipitating at least a portion of said wax from said mixture, and separating said precipitated wax from said mixture.

2. The process of claim 1 wherein the said chilling zone is divided into at least six stages.

3. The process of claim 1 wherein the degree of agitation in each of said stages is maintained between about 200 and 100,000 modified Reynolds Number.

4. The process of claim 1 wherein the cooling rate of said solvent/waxy oil mixture is below 10° F. per minute.

5. The process of claim 1 wherein said injection velocity is at least 50 feet per second and said impeller peripheral speed is at least 300 feet per minute.

6. A method for dewaxing a waxy petroleum oil stock comprising introducing said petroleum oil stock into a chilling zone divided into a plurality of stages, passing said oil stock from stage to stage of said chilling zone, injecting a cold dewaxing solvent into said chilling zone at a plurality of spaced points along said chilling zone, maintaining a high degree of agitation in at least a portion of said stages by means of a rotating impeller located in said stages thereby effecting substantially instantaneous complete mixing of said solvent and said oil, maintaining the injection velocity of said solvent at a level of at least 50 feet per second and the impeller tip speed at a level of at least 300 feet per minute, cooling said solvent/waxy oil mixture as it progresses through the chilling zone thereby precipitating at least a portion of said wax from said mixture, and separating said precipitated wax from said mixture.

7. The process of claim 6 wherein the level of agitation in each of said stages is maintained between about 200 and 100,000 modified Reynolds Number.

8. The process of claim 6 wherein the chilling zone is divided into at least six stages.

9. The process of claim 6 wherein the dewaxing solvent is a mixture comprising methyl ethyl ketone and methyl isobutyl ketone.

10. The process of claim 6 wherein the dewaxing solvent is a low molecular weight hydrocarbon.

11. The process of claim 6 wherein the dewaxing solvent is a mixture of methyl ethyl ketone and toluene.

12. A method for dewaxing a waxy petroleum oil fraction which comprises introducing said petroleum oil fraction into a chilling zone divided into at least six stages, passing said oil fraction from stage to stage of said chilling zone, injecting a cold dewaxing solvent into said chilling zone at a plurality of spaced points along said chilling zone, maintaining a level of agitation in each of said stages between about 200 and 100,000 modified Reynolds Number by means of a rotating impeller located in each of said stages, thereby effecting substantially instantaneous complete mixing of said solvent and said oil, maintaining the injection velocity of said solvent at a level of at least 50 feet per second and the impeller tip speed at a level of at least 300 feet per minute, cooling said solvent/waxy oil mixture as it progresses through the chilling zone thereby precipitating at least a portion of said wax from said mixture, and separating said precipitated wax from said mixture.

13. A method for dewaxing a waxy petroleum oil fraction comprising introducing said petroleum oil fraction into a chilling zone divided into a plurality of stages, passing said oil fraction from stage to stage of said chilling zone, injecting a cold dewaxing solvent into said chilling zone at a plurality of spaced points along said chilling zone, substantially instantaneously mixing said solvent and said oil, in at least a portion of said stages, by means of a rotating impeller located within said stages so that substantially complete mixing is effected, maintaining the injection velocity of said solvent at a level of at least 50 feet per second and the impeller tip speed at a level of at least 300 feet per minute, cooling said solvent/oil mixture as it progresses through the chilling zone thereby precipitating at least a portion of the wax from said mixture, and separating the precipitated wax from said mixture.

14. The process of claim 12 wherein said solvent/waxy oil mixture is cooled at a cooling rate of below about 10° F/minute.

* * * * *